US011079795B2

(12) United States Patent
Chen et al.

(10) Patent No.: US 11,079,795 B2
(45) Date of Patent: Aug. 3, 2021

(54) PORTABLE ELECTRONIC DEVICE

(71) Applicants: I-Lung Chen, Taipei (TW); Wang-Hung Yeh, Taipei (TW); Yi-Hsuan Wu, Taipei (TW); Shang-Che Lee, Taipei (TW); Hsiao-Ching Hung, Taipei (TW)

(72) Inventors: I-Lung Chen, Taipei (TW); Wang-Hung Yeh, Taipei (TW); Yi-Hsuan Wu, Taipei (TW); Shang-Che Lee, Taipei (TW); Hsiao-Ching Hung, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 4 days.

(21) Appl. No.: 16/143,483

(22) Filed: Sep. 27, 2018

(65) Prior Publication Data

US 2019/0101955 A1 Apr. 4, 2019

Related U.S. Application Data

(60) Provisional application No. 62/565,105, filed on Sep. 29, 2017.

(51) Int. Cl.
*G06F 1/16* (2006.01)

(52) U.S. Cl.
CPC ............ *G06F 1/1616* (2013.01); *G06F 1/166* (2013.01); *G06F 1/1613* (2013.01);
(Continued)

(58) Field of Classification Search
CPC .... G06F 1/1616; G06F 1/1679; G06F 1/1656; G06F 2200/1633; G06F 1/1613;
(Continued)

(56) References Cited

U.S. PATENT DOCUMENTS 6,490,154 B2 * 12/2002 Thompson ............ G06F 1/1632
361/679.09
D621,827 S * 8/2010 Cheng ........................ D14/327
(Continued)

FOREIGN PATENT DOCUMENTS

TW M400037 3/2011
TW I613949 2/2018

OTHER PUBLICATIONS

"Office Action of Taiwan Counterpart Application," dated Apr. 23, 2019, p. 1-p. 7.

*Primary Examiner* — Adrian S Wilson
*Assistant Examiner* — Theron S Milliser
(74) *Attorney, Agent, or Firm* — JCIPRNET

(57) ABSTRACT

A portable electronic device includes a first body, a second body, a pivot assembly, and a protective assembly. The pivot assembly is pivoted to the first body and the second body and includes a shaft. The first body pivots relative to the second body via the shaft. The protective assembly is slidably disposed at periphery of the first body and the second body and includes at least one guide structure and at least one sliding structure. When the first body moves relative to the second body from a lock position to an open position, the protective assembly drives the guide structure and the sliding structure to slide along the periphery of the first body and the second body and drive the guide structure to be coaxially arranged with the shaft to allow the protective assembly to rotate with the first body relative to the second body.

13 Claims, 9 Drawing Sheets

(52) U.S. Cl.
CPC .......... *G06F 1/1624* (2013.01); *G06F 1/1632* (2013.01); *G06F 1/1656* (2013.01); *G06F 1/1669* (2013.01); *G06F 1/1679* (2013.01); *G06F 2200/1633* (2013.01)

(58) Field of Classification Search
CPC ...... G06F 1/1624; G06F 1/1632; G06F 1/166; G06F 1/1669; G06F 1/1681
See application file for complete search history.

(56) References Cited

U.S. PATENT DOCUMENTS

| | | | |
|---|---|---|---|
| D621,828 S * | 8/2010 | Cheng | D14/327 |
| 8,228,673 B2 * | 7/2012 | Cheng | G06F 1/1616 345/173 |
| 2007/0186380 A1 * | 8/2007 | Kim | G06F 1/1616 16/239 |
| 2011/0222238 A1 * | 9/2011 | Staats | G06F 1/1632 361/679.55 |
| 2012/0224316 A1 * | 9/2012 | Shulenberger | G06F 1/1628 361/679.09 |
| 2013/0178161 A1 * | 7/2013 | Shulenberger | G06F 1/162 455/41.2 |
| 2015/0181008 A1 * | 6/2015 | Baschnagel | H04M 1/04 455/575.1 |
| 2018/0070470 A1 * | 3/2018 | Anderson | G06F 1/1613 |
| 2018/0081396 A1 * | 3/2018 | Hsieh | G06F 1/1616 |

* cited by examiner

PORTABLE ELECTRONIC DEVICE

CROSS-REFERENCE TO RELATED APPLICATION

This application claims the priority benefit of U.S. provisional application Ser. No. 62/565,105, filed on Sep. 29, 2017. The entirety of the above-mentioned patent application is hereby incorporated by reference herein and made a part of this specification.

BACKGROUND

Technical Field

The invention relates to an electronic device. More particularly, the invention relates to a portable electronic device.

Description of Related Art

Along with technology advancement, demand for laptops from users increases day by day. Taking a gaming laptop for example, in order to participate in online games or eSports competitions anytime and anywhere, a user usually put a gaming laptop into a portable protection device so as to conveniently carry the gaming laptop. Nevertheless, costs are increased if a portable protection device is purchased. Further, the use of portable protection devices may prevent electronic devices from achieving miniaturization required by users nowadays. In addition, when a gaming laptop and its peripherals and accessories are to be stored in a portable protection device, some of the peripherals and accessories may be left out. Therefore, how to allow users to conveniently carry the gaming laptops and quickly put away the peripherals and accessories after each game or when traveling is an important issue.

SUMMARY

The invention provides a portable electronic device featuring enhanced convenience to be carried or used by a user.

A portable electronic device provided by an embodiment of the invention includes a first body, a second body, a pivot assembly, and a protective assembly. The pivot assembly is pivoted to the first body and the second body and includes a shaft. The first body pivots relative to the second body via the shaft. The protective assembly is slidably disposed at periphery of the first body and the second body, and the protective assembly includes at least one guide structure and at least one sliding structure. The at least one guide structure is slidably connected to the second body, and the at least one sliding structure is slidably connected to the first body. When the first body moves relative to the second body from a lock position to an open position, the protective assembly slides to drive the guide structure and the sliding structure to slide along the periphery of the first body and the second body and drive the guide structure to be coaxially arranged with the shaft, so as to allow the protective assembly to rotate with the first body relative to the second body.

In an embodiment of the invention, the protective assembly further includes a first part, a second part, and a pair of third parts. The third parts are opposite to each other and are connected to the first part and the second part.

In an embodiment of the invention, the at least one sliding structure includes two sliding blocks respectively disposed on the third parts. Each of a pair of first side plates opposite to each other of the first body has a sliding groove, and the sliding blocks are adapted to be respectively and slidably disposed in the sliding grooves.

In an embodiment of the invention, the at least one guide structure includes two guide structures respectively disposed on the third parts. Each of a pair of second side plates opposite to each other of the second body has a guide groove, and the guide structures are adapted to be respectively and slidably disposed in the guide grooves.

In an embodiment of the invention, each of the sliding blocks has a first length, each of the guide structures has a second length, and the first length is greater than the second length.

In an embodiment of the invention, when the first body is located at the lock position relative to the second body, a horizontal distance is provided between the first part and the first body and the second body to allow the first part to be held. When the first body moves relative to the second body from the lock position to an unlock position, the first part is held to push the protective assembly in a horizontal direction so that the sliding blocks respectively slide in the sliding grooves, the guide structures respectively slide in the guide grooves to drive the guide structures to be coaxially arranged with the shaft, and the second part gradually moves away from the first body and the second body.

In an embodiment of the invention, the second body has a receiving space, and the second part of the protective assembly has a receiving groove. When the first body is located at the lock position relative to the second body, a horizontal distance is provided between the first part and the first body and the second body to allow the first part to be held. The receiving groove is located in the receiving space.

In an embodiment of the invention, When the first body is rotated relative to the second body from the unlock position to the open position, the protective assembly rotates relative to the second body with the first body so that the second part is allowed to stand on a surface to support the first body.

In an embodiment of the invention, when the first body is located at the lock position or the unlock position relative to the second body, the sliding grooves are parallel to the guide grooves.

In an embodiment of the invention, when the first body is located at the open position relative to the second body, an included angle is provided between the sliding grooves and the guide grooves.

In an embodiment of the invention, the portable electronic device further includes an adaptor disposed in the receiving groove.

In an embodiment of the invention, the first body includes a main body and a back plate, the main body is pivoted to the back plate. When the first body is located at the open position relative to the second body, the main body is adapted to pivot at an angle relative to the back plate.

In an embodiment of the invention, the portable electronic device further includes a keyboard module detachably disposed on the second body.

In an embodiment of the invention, the first body is a display module, and the second body is a system base.

A portable electronic device provided by an embodiment of the invention includes a first body, a second body, a pivot assembly, and a protective assembly. The pivot assembly is pivoted to the first body and the second body and includes a shaft. The first body pivots relative to the second body via the shaft. The protective assembly is slidably disposed at periphery of the first body and the second body and includes a part and a second part opposite to each other. The protective assembly rotates relative to the second body with the first body so that a horizontal distance is provided between the first part and the first body and the second body to allow the first part to be held or to allow the second part to stand on a surface to support the first body.

In an embodiment of the invention, the protective assembly further includes a pair of third parts, at least one sliding structure, and at least one guide structure. The pair of the third parts are opposite to each other and are connected to the first part and the second part. The sliding structure includes two sliding blocks respectively disposed on the pair of the third parts. Each of a pair of first side plates opposite to each other of the first body has a sliding groove. The sliding blocks are adapted to be respectively and slidably disposed in the sliding grooves. The guide structure includes two guide blocks respectively disposed on the pair of the third parts. Each of a pair of second side plates opposite to each other of the second body has a guide groove. The guide blocks are adapted to be respectively and slidably disposed in the guide grooves.

In an embodiment of the invention, when the protective assembly rotates relative to the second body with the first body, the sliding blocks respectively slide in the sliding grooves, the guide blocks respectively slide in the guide grooves to drive the guide blocks to be coaxially arranged with the shaft, and the second part gradually moves away from the first body and the second body.

In an embodiment of the invention, when the horizontal distance is provided between the first part and the first body and the second body to allow the first part to be held, the sliding grooves are parallel to the guide grooves.

In an embodiment of the invention, when the second part stands on the surface to support the first body, an included angle is provided between the sliding grooves and the guide grooves.

In an embodiment of the invention, the second body has a receiving space, and the second part of the protective assembly has a receiving groove. When the horizontal distance is provided between the first part and the first body and the second body to allow the first part to be held, the receiving groove is located in the receiving space.

To sum up, in the portable electronic device provided by the embodiments of the invention, the protective assembly is designed to include the guide structure. When the first body moves relative to the second body from the lock position to the open position, the protective assembly is slidably disposed at the periphery of the first body and the second body to drive the guide structure to be coaxially arranged with the shaft, so as to allow the protective assembly to rotate with the first body relative to the second body, and that the portable electronic device is opened to be used by the user. In brief, the portable electronic device provided of the invention features enhanced convenience to be carried and used by the user.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
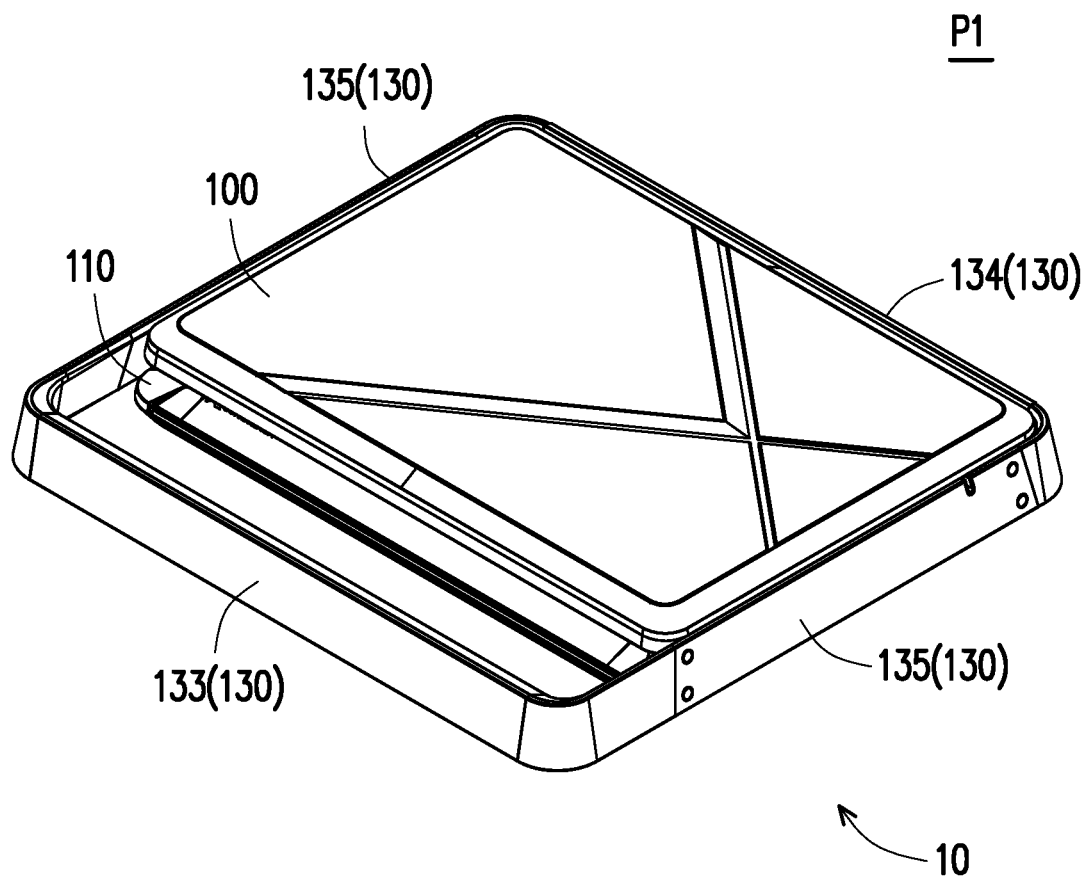
FIG. 1, FIG. 2, and FIG. 3 are schematic three-dimensional views of a portable electronic device in continuous movement from being closed to opened according to an embodiment of the invention.
Figure 2:
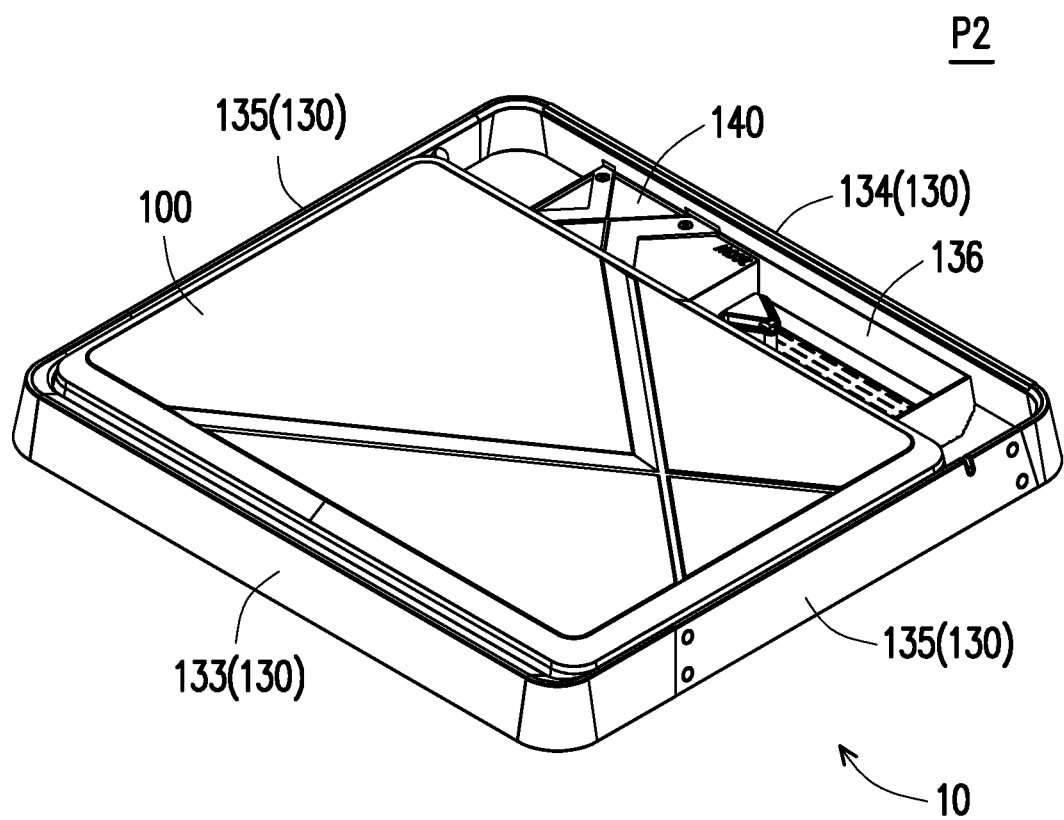
Figure 3:
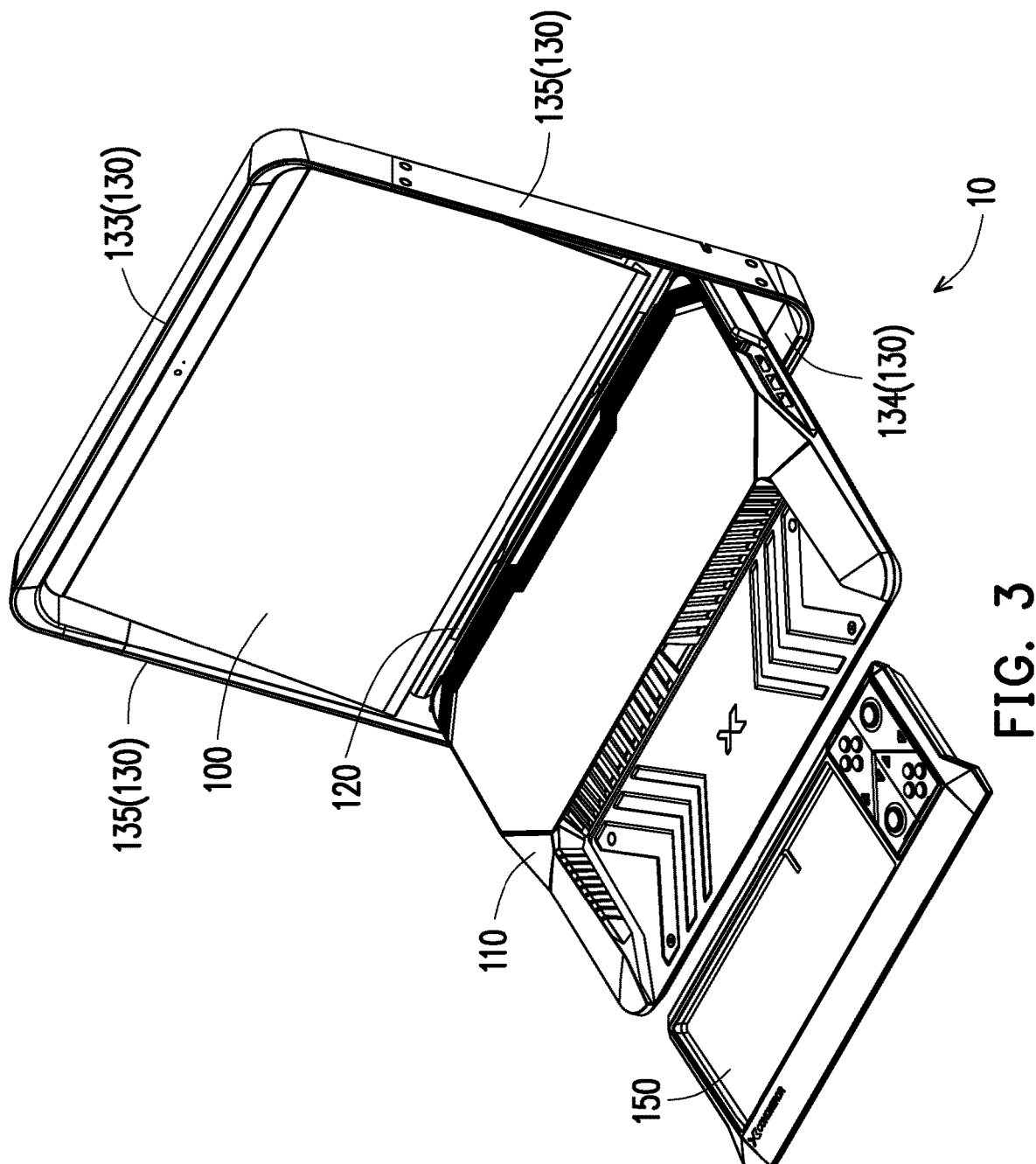
Figure 4:
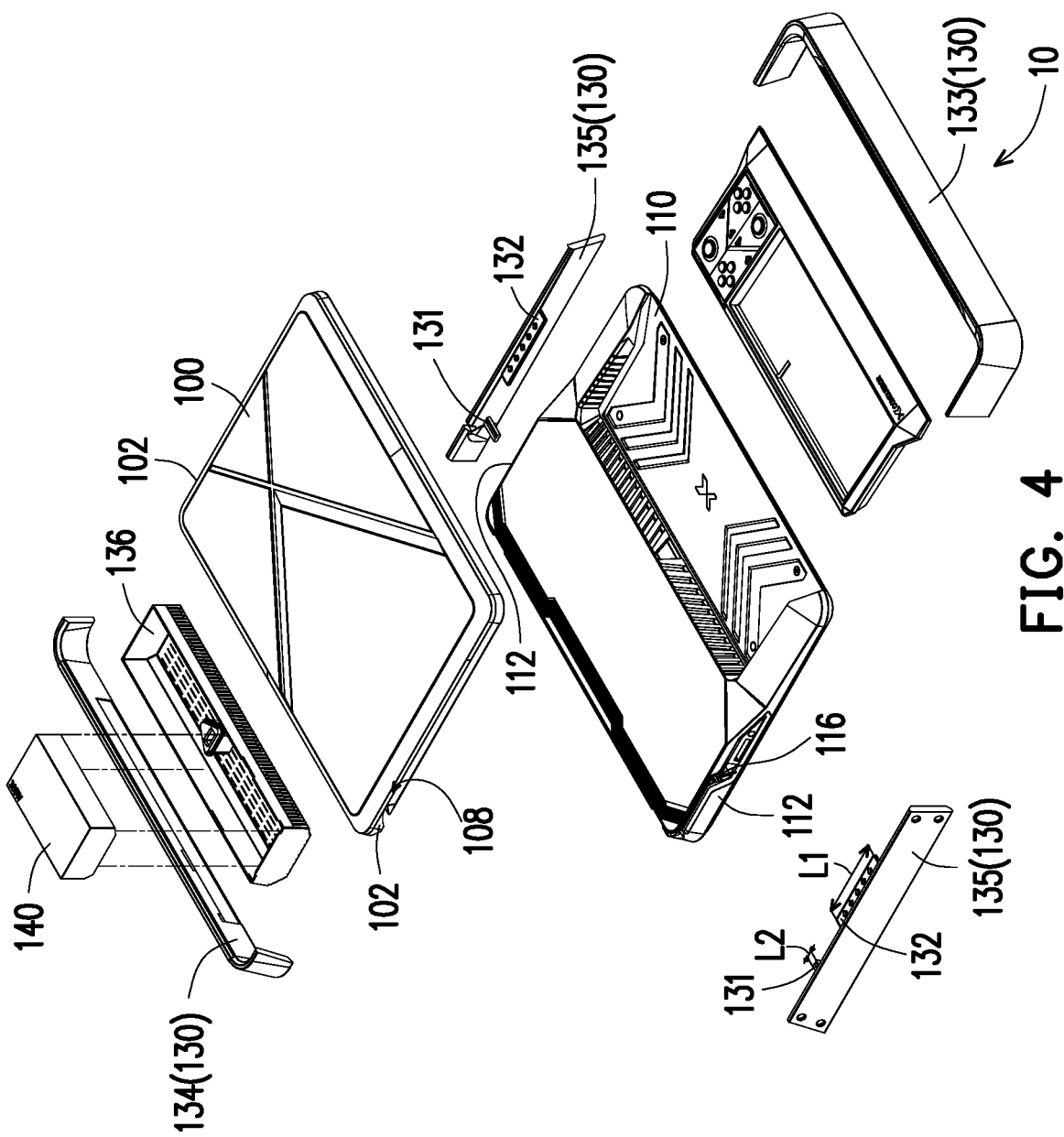
FIG. 4 is a three-dimensional exploded view of the portable electronic device of FIG. 1.
Figure 5:
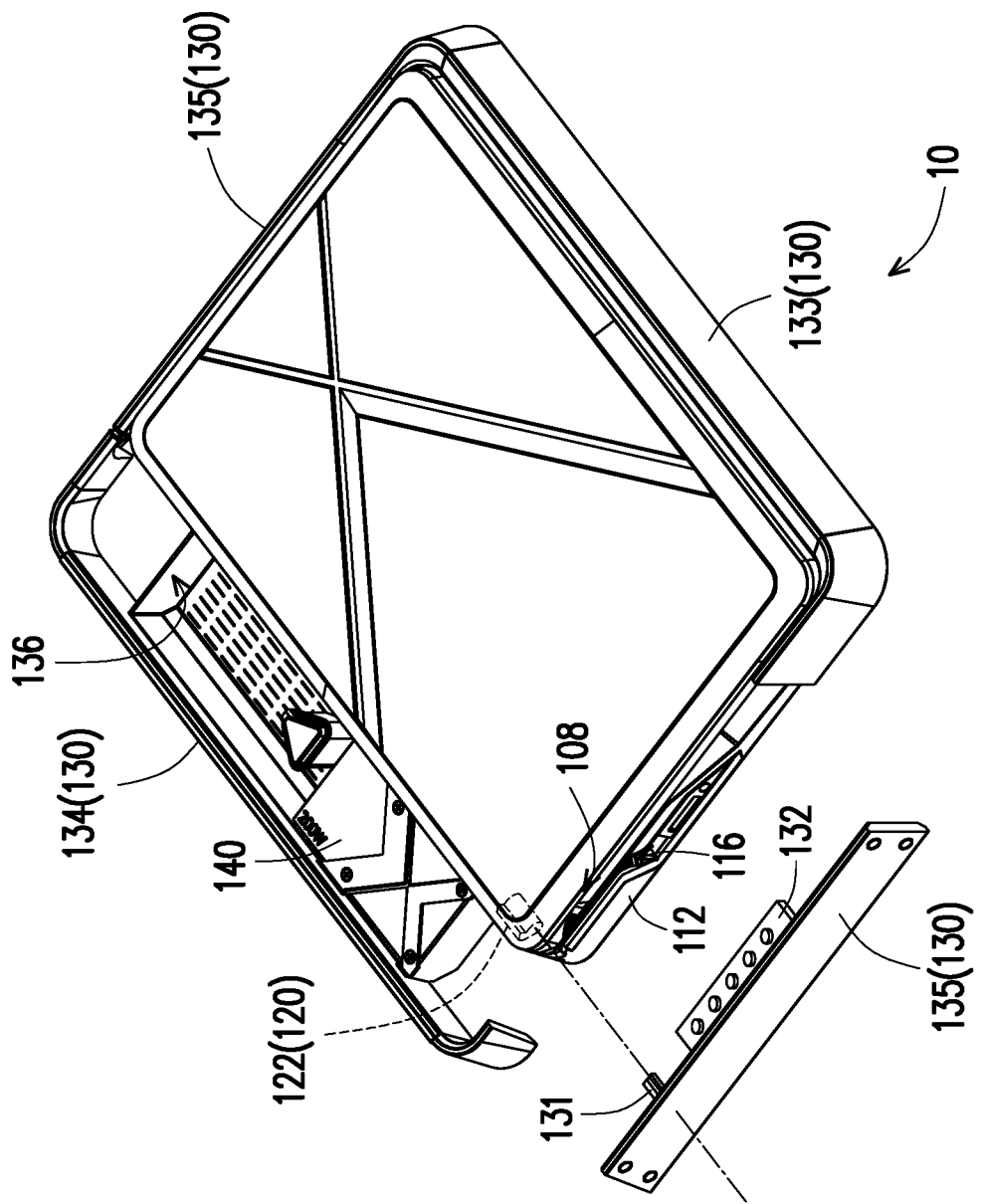
FIG. 5 is a three-dimensional exploded view of part of members of the portable electronic device of FIG. 2.
Figure 6:
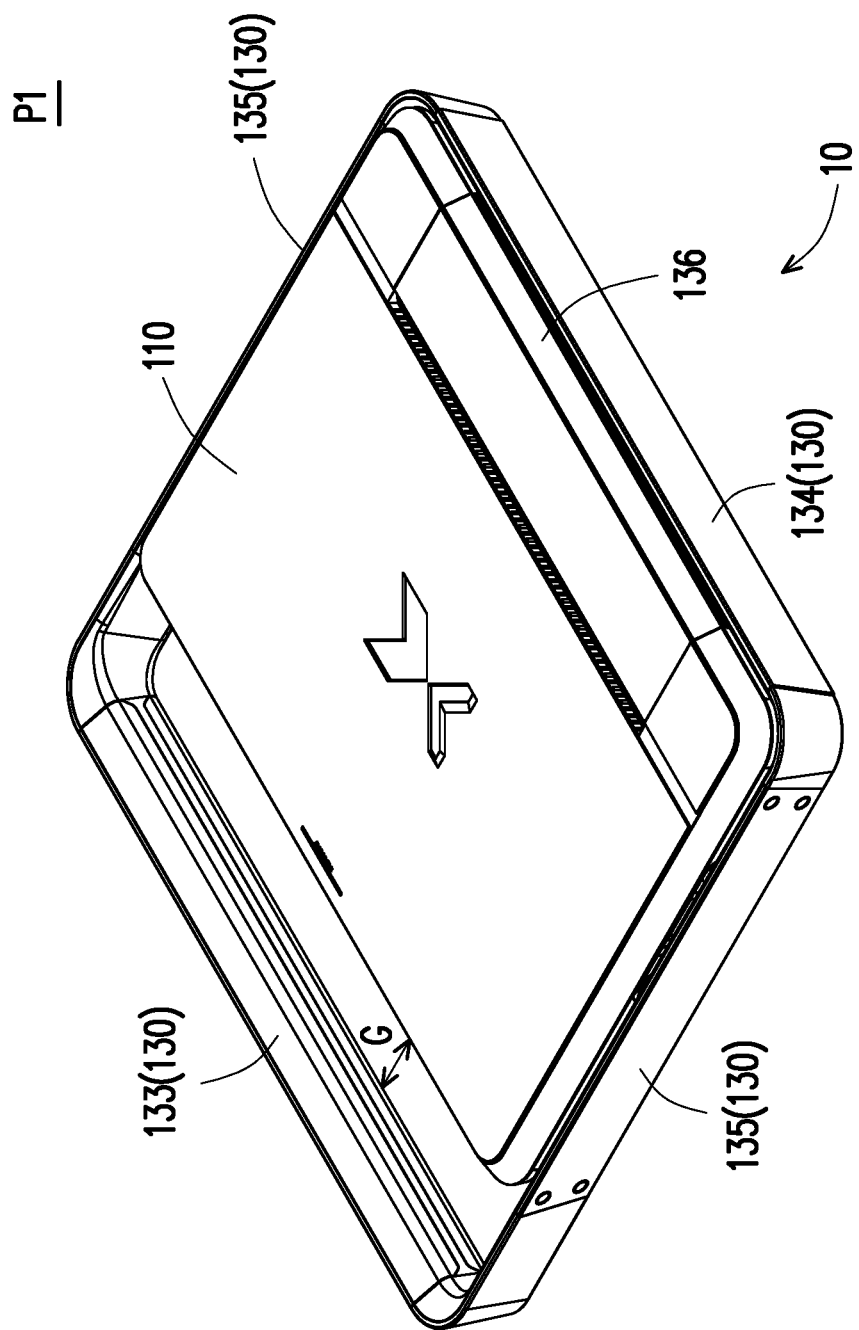
FIG. 6 is a schematic three-dimensional view of the portable electronic device of FIG. 1 from another visual angle.
Figure 7:
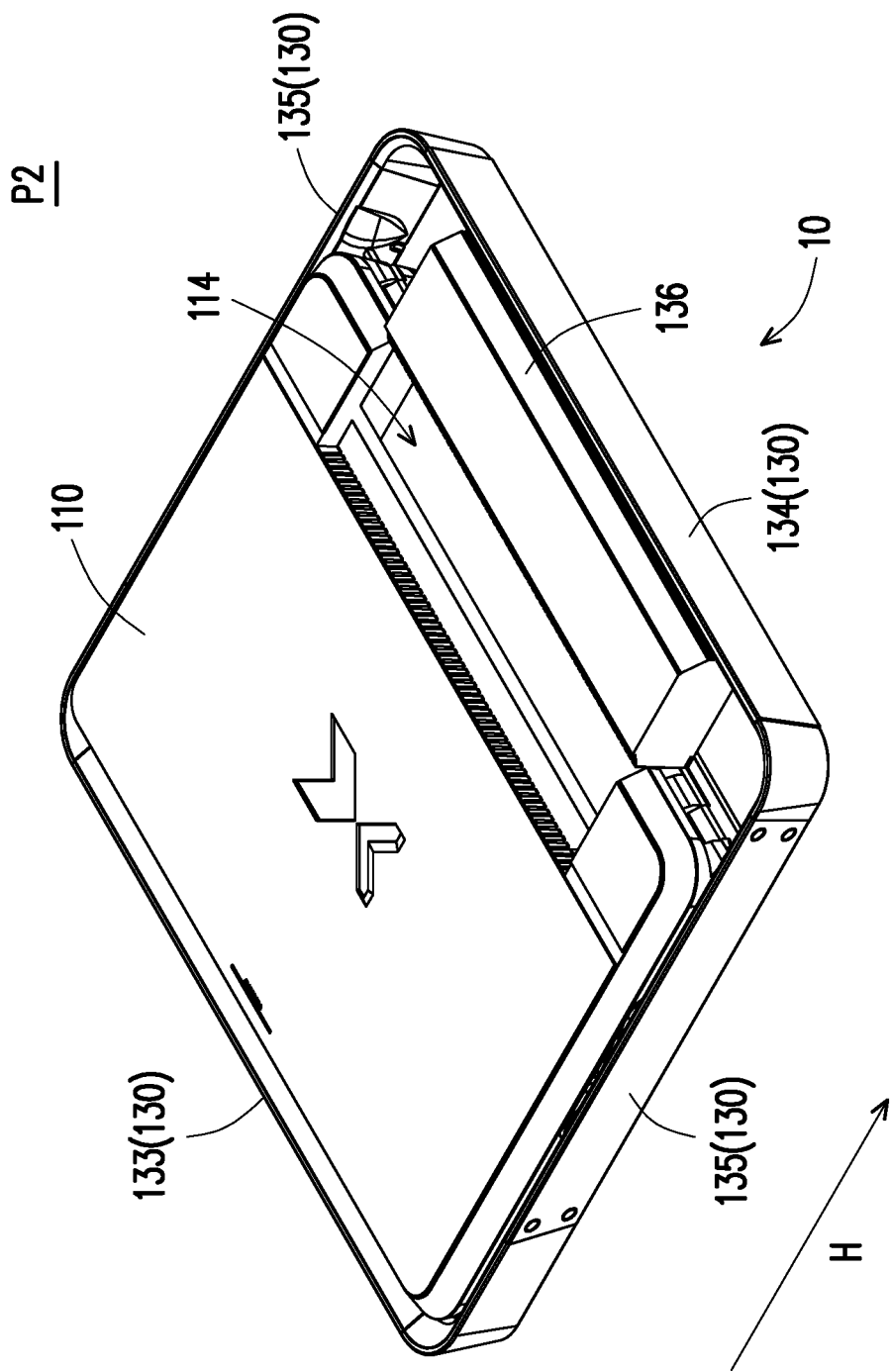
FIG. 7 is a schematic three-dimensional view of the portable electronic device of FIG. 2 from another visual angle.
Figure 8:
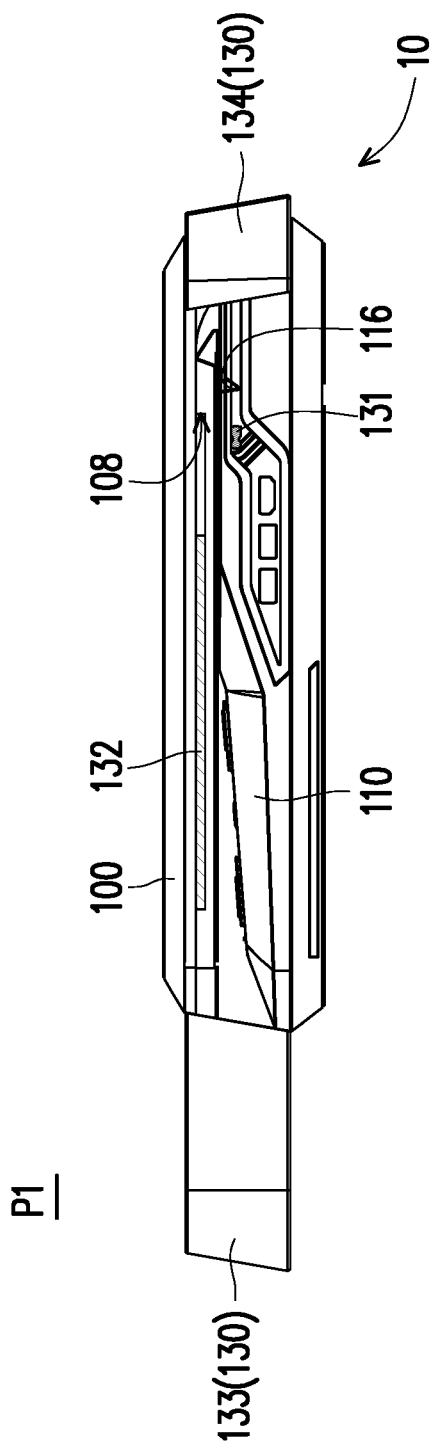
FIG. 8, FIG. 9, and FIG. 10 respectively are schematic cross-sectional views illustrating the portable electronic devices of FIG. 1, FIG. 2, and FIG. 3.
Figure 9:
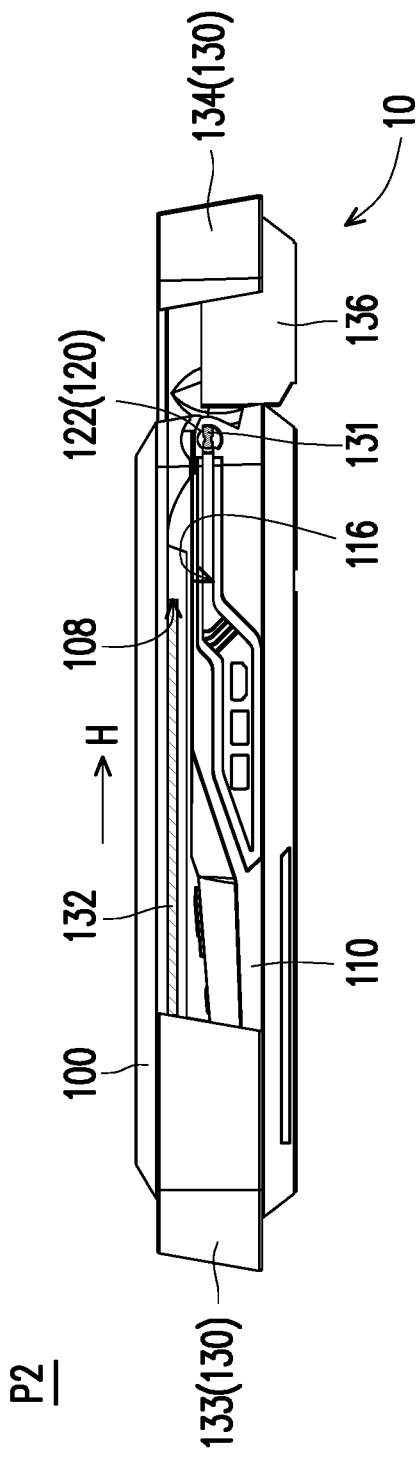
Figure 10:
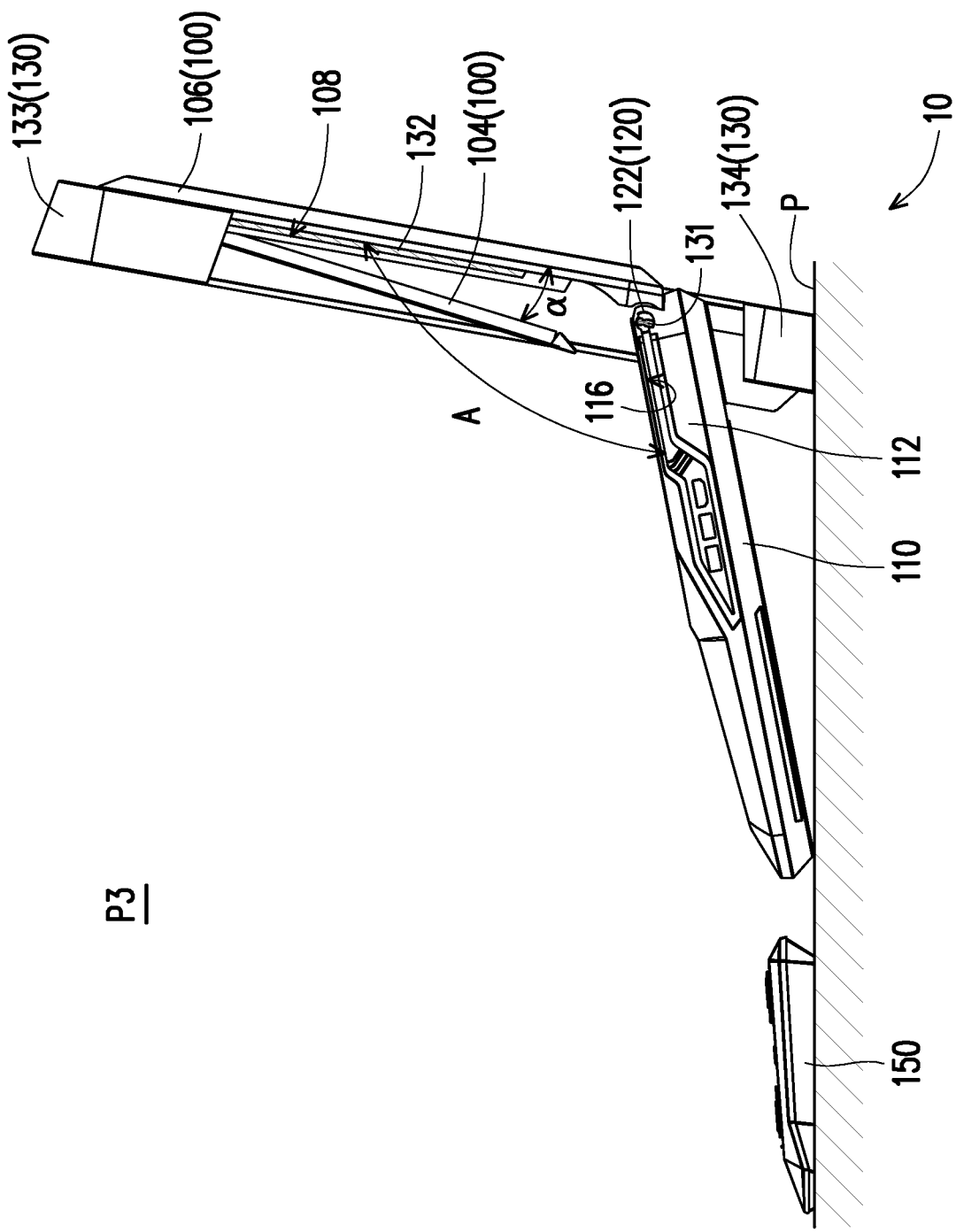

FIG. 1, FIG. 2, and FIG. 3 are schematic three-dimensional views of a portable electronic device in continuous movement from being closed to opened according to an embodiment of the invention. FIG. 4 is a three-dimensional exploded view of the portable electronic device of FIG. 1. FIG. 5 is a three-dimensional exploded view of part of members of the portable electronic device of FIG. 2. FIG. 6 is a schematic three-dimensional view of the portable electronic device of FIG. 1 from another visual angle. FIG. 7 is a schematic three-dimensional view of the portable electronic device of FIG. 2 from another visual angle. FIG. 8, FIG. 9, and FIG. 10 respectively are schematic cross-sectional views illustrating the portable electronic devices of FIG. 1, FIG. 2, and FIG. 3.

With reference to FIG. 1, FIG. 2, FIG. 3, FIG. 8, FIG. 9, and FIG. 10 first, in this embodiment, a portable electronic device 10 includes a first body 100, a second body 110, a pivot assembly 120, and a protective assembly 130. The pivot assembly 130 is pivoted to the first body 100 and the second body 110 and includes a shaft 122. Herein, the first body 100 pivots relative to the second body 110 via the shaft 122. The protective assembly 130 is slidably disposed at periphery of the first body 100 and the second body 110, and the protective assembly 130 includes at least one guide structure 131 and at least one sliding structure. Herein, the at least one sliding structure includes two sliding blocks 132 spaced apart from the at least one guide structure 131. The at least one guide structure 131 is slidably connected to the second body 110, and the at least one sliding structure is slidably connected to the first body 100. When the first body 100 moves relative to the second body 110 from a lock position P1 to an open position P3, the protective assembly 130 slides to drive the at least one guide structure 131 and at least one the sliding structure to slide along the periphery of the first body 100 and the second body 110 and drive the at least one guide structure 131 to be coaxially arranged with the shaft 122, so as to allow the protective assembly 130 to rotate with the first body 100 relative to the second body 110. Herein, the portable electronic device 10 is exemplified as a gaming laptop. The first body 100 is, for example, a display module, and the second body 110 is, for example, a system base, which are not limited in this regard.

To be specific, with reference to FIG. 4 and FIG. 5, in this embodiment, the protective assembly 130 surrounds a periphery of the first body 100 and the second body 110, so as to protect the first body 100 and the second body 110. In this embodiment, a number of the at least one guide structure 131 of the protective assembly 130 is two, and the guide structures 131 are respectively disposed on third parts 135.

Certainly, in other embodiments, the number of the at least one guide structure 131 may be one or more than two, which still falls within the scope that the invention seeks to protect. In addition, in this embodiment, the guide structures of the protective assembly 130 are exemplified as two guiding blocks, but a structural form of the guide structures is not limited in this regard. Further, the protective assembly 130 further includes a first part 133, a second part 134, and a pair of the third parts 135. The second part 134 and the first part 133 are opposite to each other, and the third parts 135 are opposite to each other and are connected to the first part 133 and the second part 134. In addition, the two sliding blocks 132 of this embodiment are respectively disposed on the third parts 135.

From another perspective, each of a pair of first side plates 102 opposite to each other of the first body 100 has a sliding groove 108. The sliding blocks 132 are adapted to be respectively correspond to the sliding grooves 108 and are slidably disposed in the sliding grooves 108. Each of a pair of second side plates 112 opposite to each other of the second body 110 has a guide groove 116. The guide structures 131 are respectively correspond to the guide grooves 116 and may be slidably disposed in the guide grooves 116. That is, the guide structures 131 and the sliding blocks 132 are disposed on the third parts 135, the guide structures 131 correspond to the guide grooves 116 of the second body 110, and the sliding blocks 132 correspond to the sliding grooves 108 of the first body 100. Herein, each of the sliding blocks 132 has a first length L1, each of the guide structures 131 has a second length L2, and the first length L1 is greater than the second length L2. Herein, as shown in FIG. 4, the sliding groove 108 is embodied as a linear sliding groove, and the guide groove 116 is formed by line-type guide grooves of a front segment and a rear segment and a slash-type guide groove of a middle segment.

With reference to FIG. 6, FIG. 7, FIG. 8, and FIG. 9, in this embodiment, the second body 110 has a receiving space 114, and the second part 134 of the protective assembly 130 has a receiving groove 136. When the first body 100 is located at the lock position P1 relative to the second body 110, a horizontal distance G is provided between the first part 133 and the first body 100 and the second body 110 to allow the first part 133 to be held. That is, the first part 133 of the protective assembly 130 works as a handle, so a user is allowed to easily lift up the portable electronic device 10 through holding the first part 133. At this time, the receiving groove 136 is located in the receiving space 114.

Further, when the first body 100 moves relative to the second body 110 from the lock position P1 to an unlock position P2, the first part 133 is held to push the protective assembly 130 in a horizontal direction H so that the sliding blocks 132 slide in the sliding grooves 108. The guide structures 131 respectively slide in the guide grooves 116, so as to drive the guide structures 131 to be coaxially arranged with the shaft 122. At this time, the second part 134 gradually moves away from the first body 100 and the second body 110 to expose the receiving groove 136. As shown in FIG. 8 and FIG. 9, when the first body 100 is located at the lock position P1 or the unlock position P2 relative to the second body 110, the sliding groove 108 is parallel to the guide groove 116.

In this embodiment, the portable electronic device 10 may further includes an adaptor 140, and the adaptor 140 is adapted to be disposed in the receiving groove 136 of the second part 134. That is, the receiving groove 136 of this embodiment is adapted to receive peripherals and accessories of the portable electronic device 10, such as a mouse (not shown), a power source supplier, a power cord (not shown), a charging line (not shown), headphones (not shown), or other accessories required by eSports players. When the first body 100 is located at the unlock position P2 relative to the second body 110, the user may take out the peripherals and the accessories stored in the receiving groove 136 for application.

Next, with reference to FIG. 3 and FIG. 10 together, when the first body 100 is rotated relative to the second body 110 from the unlock position P2 to an open position P3, the protective assembly 130 rotates relative to the second body 110 with the first body 100 so that the second part 134 is allowed to stand on a surface P to support the first body 100. At this time, when the first body 100 is located at the open position P3, an included angle A is provided between the sliding groove 108 and the guide groove 116. More specifically, the first body 100 includes a main body 104 and a back plate 106, and the main body 104 is pivoted to the back plate 106. When the first body 100 is located at the open position P3 relative to the second body 110, the main body 104 is adapted to pivot at an angle α relative to the back plate 106, so that the user may appropriately adjust an angle of the main body 104 relative to the back plate 106 to enjoy a favorable viewing angle. Further, the first body 100 of this embodiment further includes a keyboard module 150 detachably disposed on the second body 110, so as to provide a convenient using experience for the user. Note that since the second body 110 is supported by the second part 134 of the protective assembly 130 and is not entirely in contact with the surface P, heat dissipation efficiency of the portable electronic device 10 is increased.

It is worth mentioning that when the first body 100 is located at the lock position P1 relative to the second body 110, the user may hold the first part 133 to carry the portable electronic device 10. If the portable electronic device 10 is to be unlocked to be opened, the portable electronic device 10 has to be placed on a plane P, and a force is required to be applied to the first part 133 of the protective assembly 130 in a direction parallel to the plane P so as to unlock the portable electronic device 10. In other words, the portable electronic device 10 is not to be automatically unlocked when being carried around. Therefore, the portable electronic device 10 may be carried more conveniently through the design of the protective assembly 130.

In view of the foregoing, the protective assembly disposed at the periphery of the first body and the second body may protect the portable electronic device provided by the invention. When the first body is located at the lock position, the first part of the protective assembly may act as a handle so that the user may conveniently carry the portable electronic device provided by the invention when traveling. When the first body is located at the open position, the guide structure is coaxially arranged with the shaft of the pivot assembly, so that the first body can drive the protective element to pivot to the open position relative to the second body. Further, the user may store peripherals and accessories in the receiving groove disposed on the second part. The peripherals and accessories scattered around may thereby be integrated with the portable electronic device through the structural design of the receiving groove. Therefore, time for organizing and storing the peripherals and accessories is reduced and the peripherals and accessories are prevented from being left out.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A portable electronic device, comprising:
a first body;
a second body;
a pivot assembly, pivoted to the first body and the second body, and comprising a shaft, wherein the first body pivots relative to the second body via the shaft; and
a protective assembly, slidably disposed at periphery of the first body and the second body, the protective assembly comprising at least one guide structure and at least one sliding structure, the guide structure being slidably connected to the second body, the sliding structure being slidably connected to the first body, wherein when the first body moves relative to the second body from a lock position to an open position, the protective assembly slides to drive the at least one guide structure and the at least one sliding structure to slide along the periphery of the first body and the second body and drive the at least one guide structure to be coaxially arranged with the shaft, so as to allow the protective assembly to rotate with the first body relative to the second body,
wherein the first body comprises a main body and a back plate, the main body is pivoted to the back plate, and when the first body is located at the open position relative to the second body, the main body rotates an angle relative to the back plate,
wherein the protective assembly further comprises a first part, a second part opposite to the first part, and a pair of third parts opposite to each other and connected to the first part and the second part,
wherein the at least one sliding structure comprises two sliding blocks respectively disposed on the pair of the third parts, each of a pair of first side plates opposite to each other of the first body has a sliding groove, and the sliding blocks are adapted to be respectively and slidably disposed in the sliding grooves,
wherein the at least one guide structure comprises two guide structures respectively disposed on the pair of the third parts, each of a pair of second side plates opposite to each other of the second body has a guide groove, and the guide structures are adapted to be respectively and slidably disposed in the guide grooves,
wherein when the first body is located at the lock position relative to the second body, a horizontal distance is provided between the first part and the first body and the second body, so as to allow the first part to be held, when the first body moves relative to the second body from the lock position to an unlock position, the first part is held to push the protective assembly in a horizontal direction so that the sliding blocks respectively slide in the sliding grooves, the guide structures respectively slide in the guide grooves to drive the guide structures to be coaxially arranged with the shaft, and the second part gradually moves away from the first body and the second body.

2. The portable electronic device as claimed in claim 1, wherein each of the sliding blocks has a first length, each of the guide structures has a second length, and the first length is greater than the second length.

3. The portable electronic device as claimed in claim 1, wherein the second body has a receiving space, the second part of the protective assembly has a receiving groove, and when the first body is located at the lock position relative to the second body, the receiving groove is located in the receiving space.

4. The portable electronic device as claimed in claim 1, wherein when the first body is rotated relative to the second body from the unlock position to the open position, the protective assembly rotates relative to the second body with the first body, so that the second part is allowed to stand on a surface to support the first body.

5. The portable electronic device as claimed in claim 4, wherein when the first body is located at the lock position or the unlock position relative to the second body, the sliding grooves are parallel to the guide grooves.

6. The portable electronic device as claimed in claim 4, wherein when the first body is located at the open position relative to the second body, an included angle is provided between the sliding grooves and the guide grooves.

7. The portable electronic device as claimed in claim 3, further comprising an adaptor disposed in the receiving groove.

8. The portable electronic device as claimed in claim 1, further comprising a keyboard module detachably disposed on the second body.

9. The portable electronic device as claimed in claim 1, wherein the first body is a display module, and the second body is a system base.

10. A portable electronic device, comprising:
a first body;
a second body;
a pivot assembly, pivoted to the first body and the second body and comprising a shaft, wherein the first body pivots relative to the second body via the shaft; and
a protective assembly, slidably disposed at periphery of the first body and the second body and comprising a first part and a second part opposite to each other, wherein the protective assembly rotates relative to the second body with the first body so that a horizontal distance is provided between the first part and the first body and the second body to allow the first part to be held or to allow the second part to stand on a surface to support the first body,
wherein the first body comprises a main body and a back plate, the main body is pivoted to the back plate, and when the first body is located at the open position relative to the second body, the main body rotates an angle relative to the back plate,
wherein the protective assembly further comprises a pair of third parts, at least one sliding structure, and at least one guide structure, the pair of third parts opposite to each other and connected to the first part and the second part, the at least one sliding structure comprising two sliding blocks respectively disposed on the pair of the third parts, the at least one guide structure comprising two guide structures respectively disposed on the pair of the third parts,
wherein each of a pair of first side plates opposite to each other of the first body has a sliding groove, the sliding blocks are adapted to be respectively disposed in the sliding grooves, each of a pair of second side plates opposite to each other of the second body has a guide groove, and the guide structures are adapted to be respectively and slidably disposed in the guide grooves,
wherein when the protective assembly rotates relative to the second body with the first body, the sliding blocks respectively slide in the sliding grooves, the guide structures respectively slide in the guide grooves to drive the guide structures to be coaxially arranged with the shaft, and the second part gradually moves away from the first body and the second body.

11. The portable electronic device as claimed in claim 10, wherein when the horizontal distance is provided between the first part and the first body and the second body to allow the first part to be held, the sliding grooves are parallel to the guide grooves.

12. The portable electronic device as claimed in claim 10, wherein when the second part stands on the surface to support the first body, an included angle is provided between the sliding grooves and the guide grooves.

13. The portable electronic device as claimed in claim 10, wherein the second body has a receiving space, the second part of the protective assembly has a receiving groove, and when the horizontal distance is provided between the first part and the first body and the second body to allow the first part to be held, the receiving groove is located in the receiving space.

\* \* \* \* \*